(12) United States Patent
Bales et al.

(10) Patent No.: US 11,512,610 B2
(45) Date of Patent: Nov. 29, 2022

(54) MECHANICAL ATTACHMENT SCHEME FOR ISOGRID DUCTS

(71) Applicant: UNITED TECHNOLOGIES CORPORATION, Farmington, CT (US)

(72) Inventors: Daniel A. Bales, Avon, CT (US); William Bogue, Hebron, CT (US); Stuart C. Kozan, Bethany, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 334 days.

(21) Appl. No.: 16/677,349

(22) Filed: Nov. 7, 2019

(65) Prior Publication Data

US 2021/0140345 A1    May 13, 2021

(51) Int. Cl.
| | | |
|---|---|---|
| *F01D 25/24* | (2006.01) | |
| *F02C 7/22* | (2006.01) | |
| *H02G 3/32* | (2006.01) | |
| *F01D 25/28* | (2006.01) | |

(52) U.S. Cl.
CPC ...... *F01D 25/243* (2013.01); *F05B 2220/302* (2013.01); *F05D 2220/36* (2013.01); *F05D 2250/283* (2013.01)

(58) Field of Classification Search
CPC ........ F01D 25/243; F01D 25/28; F01D 25/24; F01D 25/285; F01D 25/14; F05B 2220/302; F05D 2220/36; F05D 2230/64; F05D 2230/68; F05D 2260/30; F05D 2250/283; F05D 2300/603; B29C 57/00; B29C 65/562; H02G 3/32; F02K 1/80; F02K 1/82; F23R 3/60
See application file for complete search history.

(56) References Cited

U.S. PATENT DOCUMENTS

| | | | | |
|---|---|---|---|---|
| 4,012,549 | A * | 3/1977 | Slysh | B64C 1/08 428/116 |
| 5,535,973 | A * | 7/1996 | Bailey | A61G 13/101 248/316.4 |
| 5,596,870 | A | 1/1997 | Dillard et al. | |
| 7,121,789 | B2 | 10/2006 | Richards | |
| 7,703,256 | B2 * | 4/2010 | Haddock | F16B 5/0004 52/543 |
| 10,208,626 | B2 | 2/2019 | Steel et al. | |

(Continued)

FOREIGN PATENT DOCUMENTS

| | | | |
|---|---|---|---|
| GB | 2526321 | | 11/2015 |
| GB | 2526321 | A * | 11/2015 |
| WO | 2011036381 | | 3/2011 |

OTHER PUBLICATIONS

European Patent Office, European Search Report dated Apr. 1, 2021 in Application No. 20205719.6.

*Primary Examiner* — Eric J Zamora Alvarez
(74) *Attorney, Agent, or Firm* — Snell & Wilmer L.L.P.

(57) ABSTRACT

A clamp for securing a component to an isogrid case of a gas turbine engine includes a top having an attachment feature for coupling the clamp to the component. The clamp further includes a bottom. The clamp further includes two sides extending from the top towards the bottom, each of the two sides being thicker at the bottom than at the top, and the two sides defining a shaped slot closer to the bottom than the top for receiving a rib of the isogrid case.

16 Claims, 5 Drawing Sheets

(56) References Cited

U.S. PATENT DOCUMENTS

| | | | |
|---|---|---|---|
| 2010/0154280 A1* | 6/2010 | LaFrance | F41H 5/12 42/124 |
| 2010/0192505 A1 | 8/2010 | Schaefer et al. | |
| 2013/0139368 A1 | 6/2013 | Iseki et al. | |
| 2014/0050571 A1 | 2/2014 | Sauerhoefer et al. | |
| 2018/0186463 A1 | 7/2018 | Gallant et al. | |
| 2020/0256363 A1* | 8/2020 | Juzak | F16B 5/0621 |

* cited by examiner

MECHANICAL ATTACHMENT SCHEME FOR ISOGRID DUCTS

FIELD

The present disclosure relates generally to gas turbine engines and, more particularly, to a system for coupling a component to an isogrid case of a gas turbine engine.

BACKGROUND

Gas turbine engines include compressor sections to compress an airflow, combustor sections that combine the airflow with fuel for combustion and generate exhaust, and turbine sections that convert the exhaust into torque to drive the compressor sections. An isogrid case, having various external and/or internal ribs, may enclose a portion or all of one or more of the compressor section, the combustor section, and the turbine section. It may be desirable to couple various components to the isogrid case to maintain consistent clearance to the case or to provide vibration damping or structural support to the component. For example, it may be desirable to couple one or more cable, harness, pipe or tube to the isogrid case, such harness carrying electrical wiring and the pipe or tube carrying fluids to various components of the gas turbine engine. Conventional methods of coupling these components to isogrid cases include strategically locating thick-walled pads in the case wall where the tubes and other components are to be attached, and coupling the tubes and components to the pads. However, permanent thick-walled mounting pads may fail to offer the ability de-tune unpredicted vibratory issues that may occur during engine operation, and such mounting pads may not be reusable or replaceable. These thick wall pads may also increase manufacturing complexity and provide for inhomogeneity of the part structural requirements, thus further increasing the complexity of the design process.

SUMMARY

Described herein is a clamp for securing a component to an isogrid case of a gas turbine engine. The clamp includes a top having an attachment feature for coupling the clamp to the component. The clamp further includes a bottom. The clamp further includes two sides extending from the top towards the bottom, each of the two sides being thicker at the bottom than at the top, and the two sides defining a shaped slot closer to the bottom than the top for receiving a rib of the isogrid case.

In any of the foregoing embodiments, the shaped slot has a vertical portion defined between the two sides, and a horizontal portion partially defined by a first side of the two sides and partially defined by a second side of the two sides.

In any of the foregoing embodiments, each of the two sides defines a boss for receiving a fastener.

In any of the foregoing embodiments, the boss on at least one of the two sides is threaded.

In any of the foregoing embodiments, each of the two sides defines a lightening hole closer to the bottom than the top and configured to reduce a total weight of the clamp.

In any of the foregoing embodiments, the attachment feature includes a threaded post formed monolithic with the clamp or coupled to the clamp.

Any of the foregoing embodiments may further include a vibration isolating coating applied to portions of the two sides and the bottom.

In any of the foregoing embodiments, the vibration isolating coating includes at least one of an elastomer or a thermoplastic.

In any of the foregoing embodiments, the clamp is configured to be fastened to the rib of the isogrid case by spreading the two sides apart, placing the shaped slot over the rib, and securing the clamp to the rib using a fastener through the two sides to reduce the likelihood of the two sides separating.

Also disclosed is a clamp for securing a component to an isogrid case of a gas turbine engine. The clamp includes a top having an attachment feature for coupling the clamp to the component. The clamp further includes a bottom. The clamp further includes two sides extending from the top towards the bottom, each of the two sides being thicker at the bottom than at the top, and the two sides defining a shaped slot closer to the bottom than the top for receiving a rib of the isogrid case, the shaped slot having a vertical portion defined between the two sides and a horizontal portion at least partially defined by each of the two sides, and each of the two sides defining a boss for receiving a fastener.

In any of the foregoing embodiments, the boss on at least one of the two sides is threaded.

In any of the foregoing embodiments, each of the two sides defines a lightening hole closer to the bottom than the top and configured to reduce a total weight of the clamp.

In any of the foregoing embodiments, the attachment feature includes a threaded post formed monolithic with the clamp or coupled to the clamp.

Any of the foregoing embodiments may further include a vibration isolating coating applied to portions of the two sides and the bottom.

In any of the foregoing embodiments, the vibration isolating coating includes at least one of an elastomer or a thermoplastic.

In any of the foregoing embodiments, the clamp is configured to be fastened to the rib of the isogrid case by spreading the two sides apart, placing the shaped slot over the rib, and securing the clamp to the rib using the fastener through the two sides to reduce the likelihood of the two sides separating.

Also disclosed is a system for securing components to a gas turbine engine. The system includes an isogrid case having a rib and configured to be coupled to the gas turbine engine. The system further includes a clamp for securing a component to the isogrid case. The clamp includes a top having an attachment feature for coupling the clamp to the component. The clamp further includes a bottom. The clamp further includes two sides extending from the top towards the bottom, each of the two sides being thicker at the bottom than at the top, and the two sides defining a shaped slot closer to the bottom than the top for receiving the rib of the isogrid case to couple the clamp to the isogrid case.

In any of the foregoing embodiments, the shaped slot has a vertical portion defined between the two sides, and a horizontal portion partially defined by a first side of the two sides and partially defined by a second side of the two sides.

In any of the foregoing embodiments, each of the two sides defines a boss for receiving a fastener, and wherein the boss on at least one of the two sides is threaded.

In any of the foregoing embodiments, each of the two sides defines a lightening hole closer to the bottom than the top and configured to reduce a total weight of the clamp.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
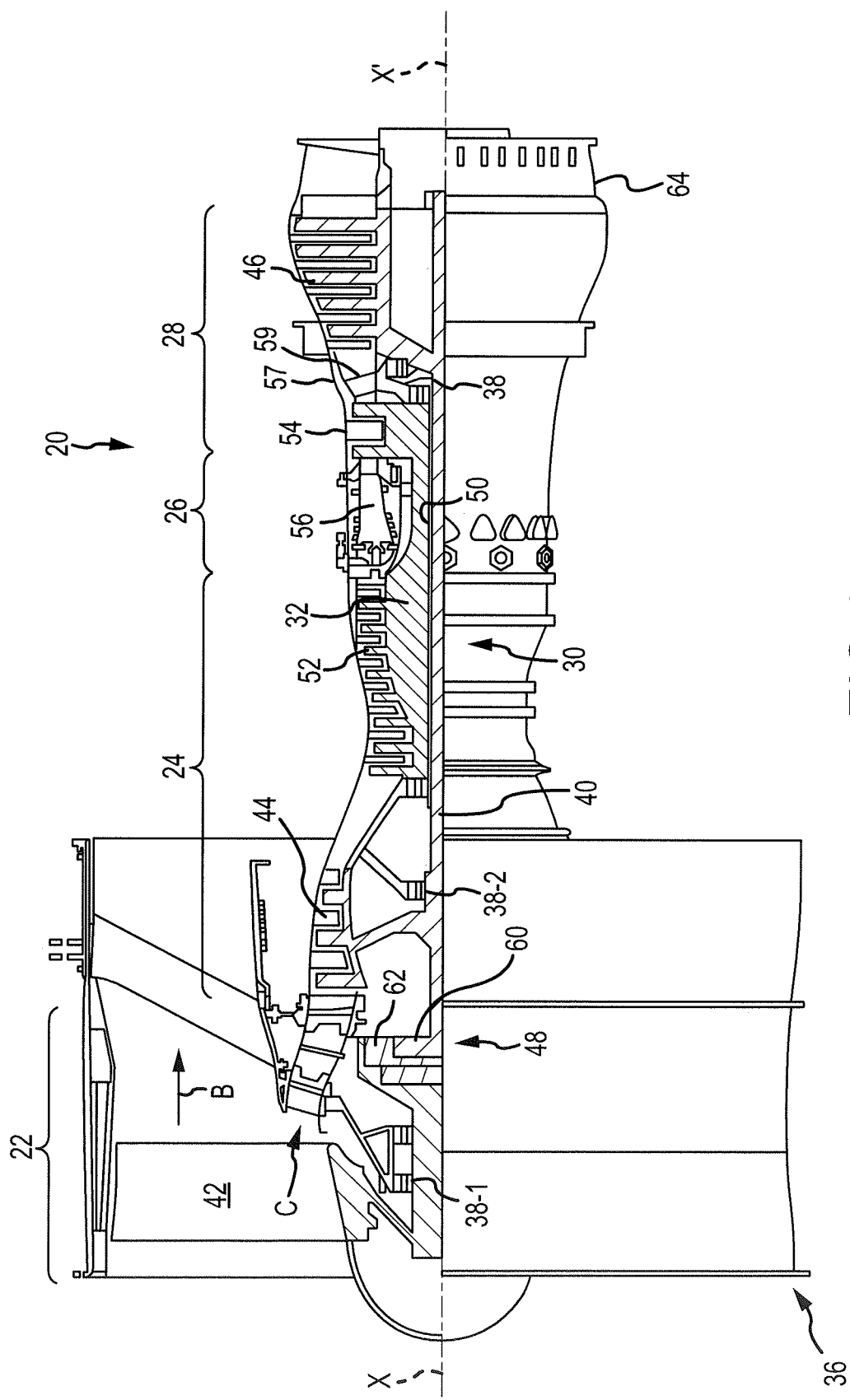
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction.

The gas turbine engine 20 may be a two-spool turbofan that generally incorporates a fan section 22, a compressor section 24, a combustor section 26 and a turbine section 28. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures, geared turbofan architectures, and turboshaft or industrial gas turbines with one or more spools.

The gas turbine engine 20 generally comprises a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft, and thus the fan 42, at a lower speed than the low speed spool 30. The geared architecture 48 includes a gear assembly 60 enclosed within a gear diffuser case 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

The gas turbine engine 20 may further include a case 64. In various embodiments, the case 64 may be an isogrid case, meaning that the case may include one or more ribs on at least one of an outer surface or an inner surface. Frequently, the ribs are wider on an end furthest from a case in order to provide increased stiffness contributed by the rib. The rib may be used to fasten, couple, or otherwise attached a component (such as a cable, harness, pipe, tube, or the like) to the case 64.

Figure 2:
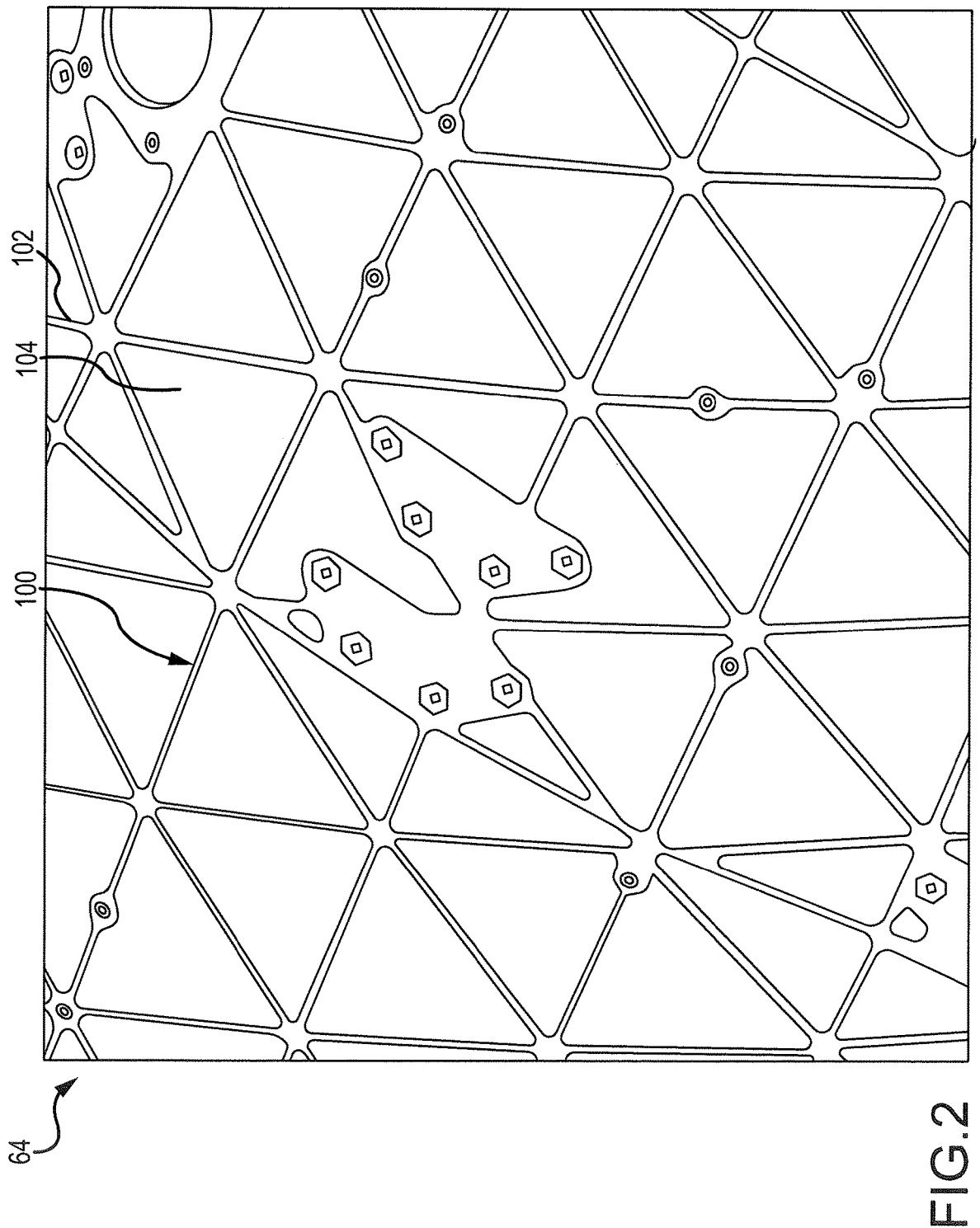
FIG. 2 is a drawing of a portion of an isogrid case of the gas turbine engine of FIG. 1, in accordance with various embodiments.

In particular and referring to FIG. 2, the isogrid case 64 may include a plurality of ribs 100 including a first rib 102. The plurality of ribs 100 may form any shape or pattern, and may extend from a surface 104 of the isogrid case 64. In various embodiments, the surface 104 is generally an outer surface (i.e., facing away from the axis X-X' of FIG. 1) for ease of installation and removal of external components, but may be an inner surface (i.e., facing towards the axis X-X' of FIG. 1).

Figure 3:
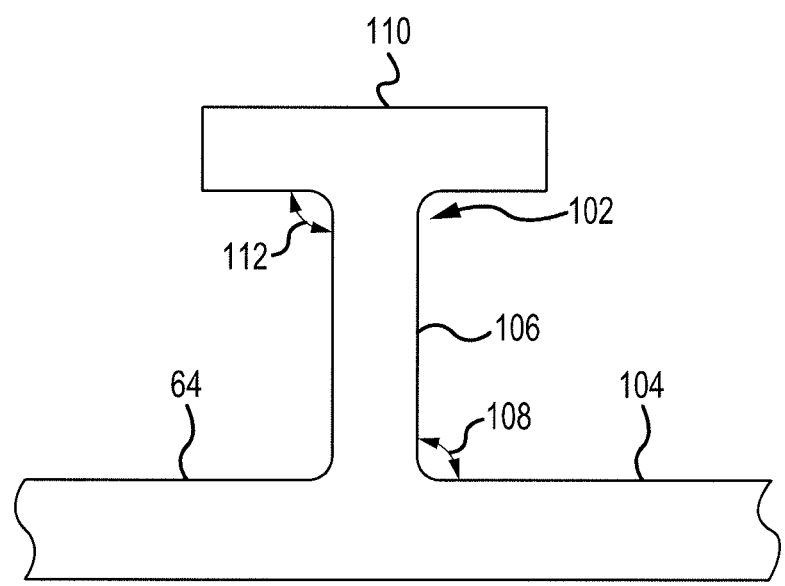
FIG. 3 is a cross-sectional view of a portion of a rib of the isogrid case of FIG. 2, in accordance with various embodiments.

Turning now to FIG. 3, a cross-sectional view of the rib 102 is shown. As shown, the rib 102 may extend away from the surface 104 of the isogrid case 64. The rib 102 may include a vertical portion 106 extending substantially at a right angle 108 from the surface 104, and a horizontal portion 110 extending in a direction substantially parallel to the surface 104. In that regard, a substantially right angle 112 may be formed between the vertical portion 106 and the horizontal portion 110. Where used in this context, "substantially" may refer to the angle plus or minus 10 degrees, plus or minus 20 degrees, plus or minus 45 degrees, or the like.

Figure 4:
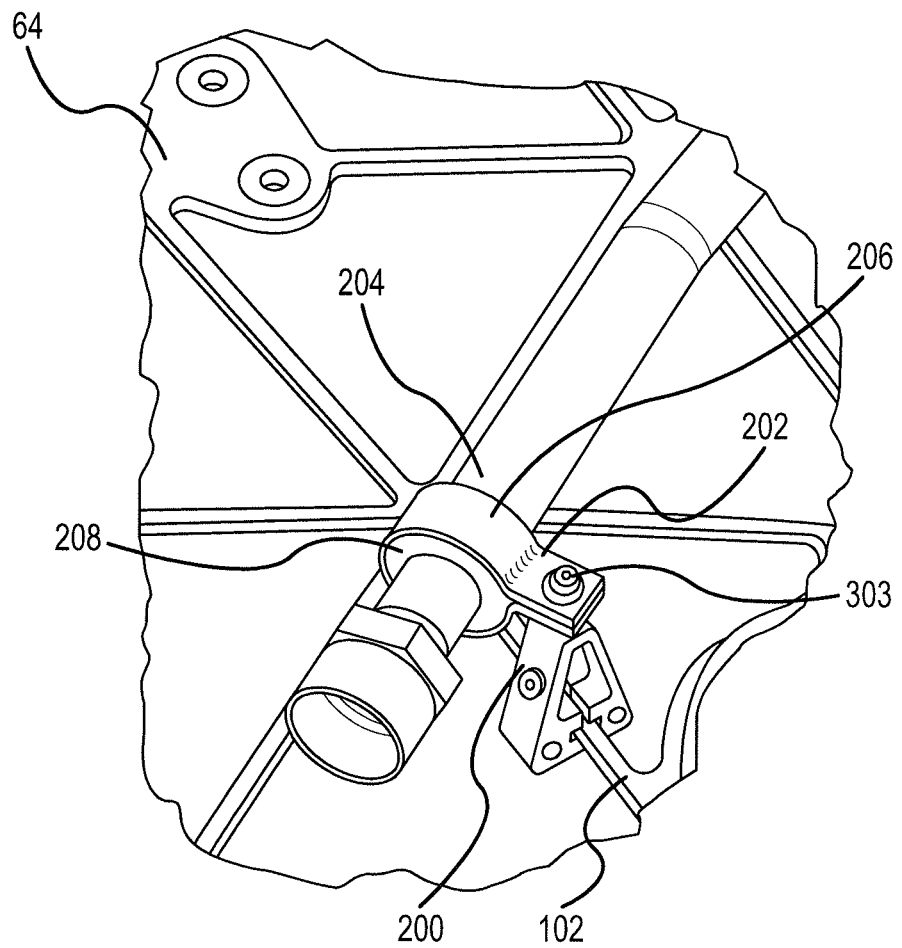
FIG. 4 is a drawing of a portion of the isogrid case of FIG. 2 with a tube coupled to the rib of FIG. 3 using a clamp, in accordance with various embodiments.

Referring now to FIG. 4, an exemplary use of the isogrid case 64 is shown. In particular, a clamp 200 may be fastened or otherwise attached to the rib 102. An adapter 202 may be coupled to the clamp 200 and may likewise be coupled to a tube 204. In that regard, the tube 204 may be coupled to the isogrid case 64 via the adapter 202 and the clamp 200. Multiple clamps 200 may be coupled to the various ribs of the isogrid case 64 in order to fasten various components to the isogrid case 64. Additionally, the clamp 200 and the adapter 202 may be reusable such that they may be moved to various locations on the isogrid case 64 and used to couple multiple components to the isogrid case 64.

The tube 204 may be coupled to the clamp 200 via a thin-walled split metal clamp 206 surrounding a split rubber bushing 208. The thin-walled split metal clamp 206 may be coupled to the clamp 200 via a threaded post 303 (as shown in more detail in FIG. 5).

Figure 5:
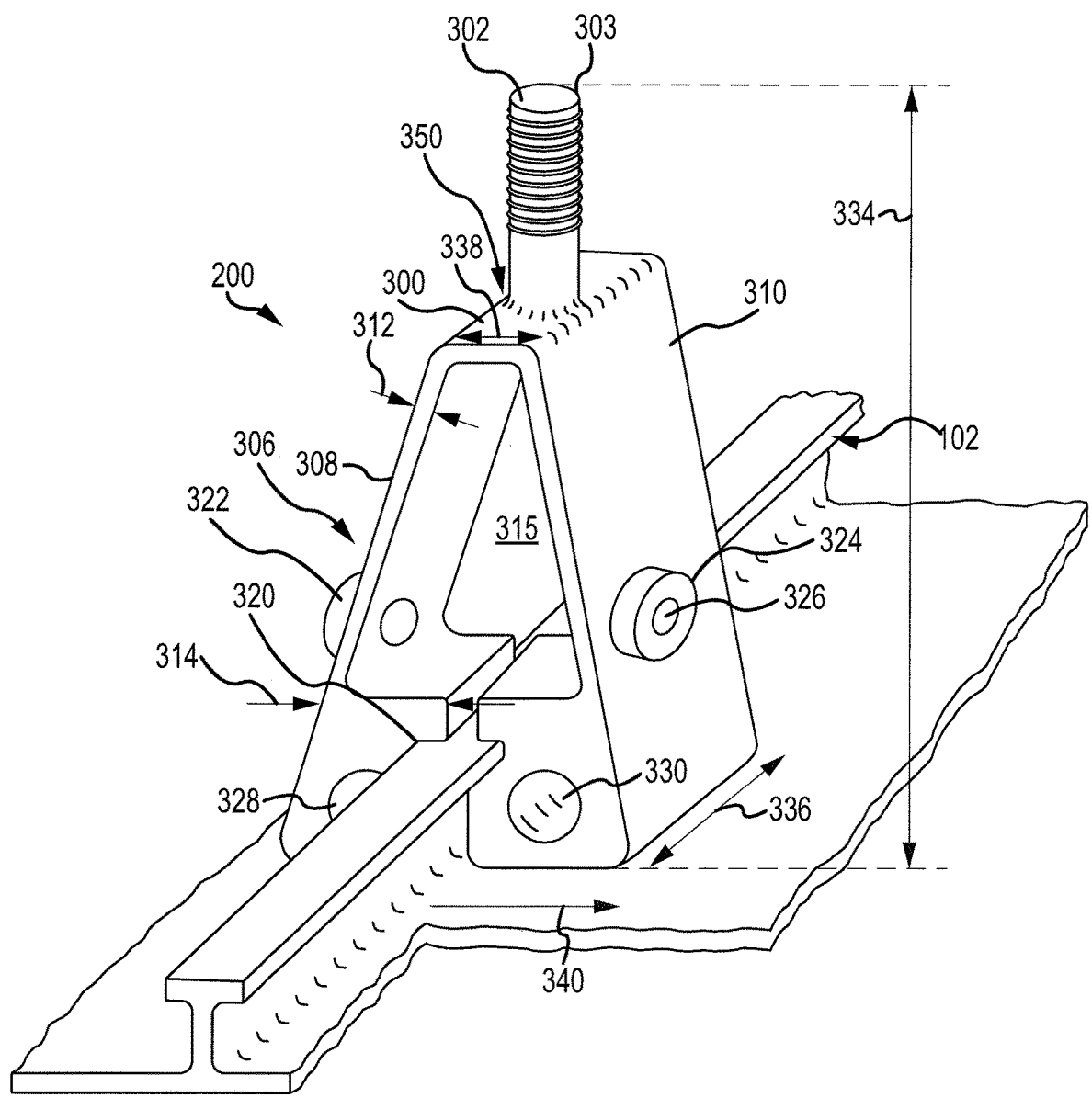
FIG. 5 is a drawing illustrating various features of the clamp of FIG. 4, in accordance with various embodiments.

Referring now to FIG. 5, additional details of the clamp 200 are shown. In various embodiments, all portions of the clamp 200 may be formed integrally, or monolithically, together and may thus be or include a single piece of material. The clamp 200 includes a top 300, a bottom 304, and two sides 306 including a first side 308 and a second side 310. In various embodiments, some portions of the clamp (such as an attachment feature 302) may be formed separate from the clamp 200 and may be coupled to the clamp 200 after forming the clamp 200 and the attachment feature 302 separately. In various embodiments, multiple portions of the clamp (up to and including all portions) may be formed separately and may be coupled together using any technique (e.g., welding, brazing, etc.) to form the clamp 200.

The clamp 200 may include the attachment feature 302 extending away from the top 300. In various embodiments, the attachment feature 302 may include a threaded post 303. Any component or adapter (such as the adapter 202 of FIG. 4) may be coupled to the clamp 200 via the attachment feature 302. For example, the adapter 202 of FIG. 4 may include an internal clearance hole and may be coupled with two threaded nuts for adjustably attaching rigidly the threaded post 303. In various embodiments, the attachment feature 302 may include any other type of attachment feature such as a snap fit, a threaded aperture, or the like. In various embodiments, a filet 350 may be formed at the transition of the top 300 and the threaded post 303.

The two sides 306 may be thicker towards the bottom 304 of the clamp 200 than towards the top 300. In that regard, the two sides 306 may have a first thickness 312 and a second thickness 314 that is closer to the bottom 304 than the first thickness 312. Such a design results in a central opening 315 defined between the two sides 306. This design desirably reduces a total weight of the clamp 200.

The portion of the two sides 306 below the central opening 315 may define a shaped slot 316. The shaped slot 316 may have a shape that at least partially matches the cross-sectional shape of the rib 102 of FIG. 3. That is, the shaped slot 316 may have a vertical portion 318 having a similar shape and dimension as the vertical portion 106 of the rib 102 of FIG. 3, and may have a horizontal portion 320 having a similar shape and dimension as the horizontal portion 110 of the rib 102 of FIG. 3.

The shaped slot 316 may extend from the bottom 304 to the central opening 315. In that regard, the two sides 306 may be forced apart, the shaped slot 316 may be placed over the rib 102 of FIG. 3, and the two sides 306 may be released such that the rib 102 is enclosed within the shaped slot 316. Such actions, along with the shape of the shaped slot 316 and the shape of the rib 102 of FIG. 3, results in the clamp 200 being at least partially coupled to the rib 102.

The two sides 306 may each include or define a boss used for receiving a fastener. In particular, the first side 308 may define a first boss 322, and the second side 310 may define a second boss 324. In various embodiments, one or both of the bosses 322, 324 may include or define a threading 326. In that regard, after the clamp 200 has been positioned over the rib 102 of FIG. 3, a fastener (such as a bolt, screw, or the like) may be inserted through the bosses 322, 324 and fastened in order to secure the clamp 200 to the rib 102.

In various embodiments, lightening holes 328, 330 may be formed through the two sides 306 at the thicker portions of the two sides 306 (i.e., the portions between the central opening 315 and the bottom 304). The lightening holes 328, 330 may extend through a portion or all of a length 336 of the clamp 200. In various embodiments, any quantity and shape of lightening holes 328, 330 may be formed or included in the clamp 200. The lightening holes 328, 330 may desirably reduce a total weight of the clamp 200.

In various embodiments, a portion or all of the clamp 200 may be coated with a vibration isolating coating 332. For example, the bottom 304 and the surfaces defining the shaped slot 316 may be coated with the vibration isolating coating 332. In various embodiments, the surfaces defining the holes of the bosses 322, 324 may likewise be coated with the vibration isolating coating 332. In various embodiments, each surface of the clamp 200 which contacts another component (e.g., surfaces of the clamp 200 which contact the rib 102 and the surface 104 of the isogrid case 64 of FIG. 2, along with the fastener received by the bosses 322, 324) may be coated with the vibration isolating coating 332.

In various embodiments, the vibration isolating coating 332 may include any one or more of an elastomer or a thermoplastic. It is desirable for the thermoplastic or elastomer to be non-wearing to the bosses 322, 324 or the isogrid case 64 but still durable in the operating temperature and environment of the clamp 200. The thermoplastic may include but is not limited to polyetheretherketone (PEEK), polyetherketone (PEK), polyetherimide (PEI), thermoplastic polyimide, polyamideimide (PAI), or a polytetrafluoroethene (PTFE). The vibration isolating coating 332 may be applied in any known manner such as dipping the clamp 200 into a fluid coating, brushing a fluid coating onto the clamp 200, spraying a fluid coating onto the clamp 200, or the like.

In various embodiments, the vibration isolating coating 332 may include a pre-formed material (such as a cushion, a foam, or another compressible material) which may be retained in place relative to the respective portion of the clamp 200. In various embodiments, a cushion version of the vibration isolating coating 332 may be coupled to the clamp 200 using any known method such as a compression fit (e.g., the vibration isolating coating 332 may be compressed between the clamp 200 and the rib), use of an adhesive, use of a fastener, or the like.

The vibration isolating coating 332 may reduce or eliminate the passage of vibrational energy from a component or object on one side of the vibration isolating coating 332 to a component or object on another side of the vibration isolating coating 332. In that regard, the vibration isolation coating 332 may provide vibration isolation capabilities.

The clamp 200 may have a height 334, a length 336, a top width 338 at the top 300, and a bottom width 340 at the bottom 304. In various embodiments, the height 334 may be between 1 inch and 6 inches (2.54 centimeters (cm) and 15.2 cm), between 1 inch and 4 inches (2.54 cm and 10.2 cm), or between 2 inches and 3 inches (5.08 cm and 7.62 cm).

In various embodiments, the length 336 may be between 0.25 inches and 2 inches (0.635 cm and 5.08 cm), between 0.5 inches and 1 inch (1.27 cm and 2.54 cm), or about 0.75 inches (1.91 cm). Where used in this context, about refers to the referenced value plus or minus 10 percent of the referenced value.

In various embodiments, the top width 338 may be between 0.05 inches and 1 inch (0.127 cm and 2.54 cm), between 0.1 inches and 0.5 inches (0.254 cm and 1.27 cm), or about 0.25 inches (0.635 cm). In various embodiments, the bottom width 340 may be between 0.25 inches and 3 inches (0.635 cm and 7.62 cm), between 0.5 inches and 2 inches (1.27 cm and 5.08 cm), or about 1.25 inches (3.18 cm).

In various embodiments, the clamp 200 may be formed from a metal such as aluminum, titanium, steel, a metal alloy, or the like. The clamp 200 may be formed using any known method such as casting, forging, additive manufacturing, or the like.

The clamp 200 may provide various benefits over conventional methods of coupling components to isogrid cases. In particular, the clamp 200 may be reused over and over without damaging any portion of the isogrid case. Additionally, the clamp 200 provides improved damping over conventional methods of coupling components to isogrid cases, reducing or eliminating vibratory issues with components coupled to the isogrid case. The clamp 200 further provides improved structural integrity over conventional methods of coupling components to isogrid cases.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A clamp for securing a component to an isogrid case of a gas turbine engine, the clamp comprising:
    a top;

an attachment feature disposed at the top, wherein the attachment feature is for coupling the clamp to the component, wherein the attachment feature includes a threaded post coupled to the clamp;

a bottom; and two sides extending from the top towards the bottom, each of the two sides being thicker at the bottom than at the top, and the two sides defining a shaped slot closer to the bottom than the top for receiving a rib of the isogrid case, the rib having a vertical portion extending at a right angle from a surface of the isogrid case and a horizontal portion extending in a direction parallel to the surface, a right angle being formed between a vertical outer surface of the vertical portion and a horizontal outer surface of the horizontal portion, the shaped slot having a vertical portion having a corresponding shape and dimension of the vertical portion of the rib and a horizontal portion having a corresponding shape and dimension as the horizontal portion of the rib;

wherein each of the two sides defines a lightening hole closer to the bottom than the top and configured to reduce a total weight of the clamp, wherein the lightening holes are disposed between a central opening and the bottom, wherein the central opening is defined between the two sides.

2. The clamp of claim 1, wherein the vertical portion of the shaped slot is defined between the two sides, and the horizontal portion of the shaped slot is partially defined by a first side of the two sides and partially defined by a second side of the two sides.

3. The clamp of claim 1, wherein each of the two sides defines a boss for receiving a fastener.

4. The clamp of claim 3, wherein the boss on at least one of the two sides is threaded.

5. The clamp of claim 1, wherein the threaded post is formed monolithically with the clamp.

6. The clamp of claim 1, wherein the clamp is configured to be fastened to the rib of the isogrid case by spreading the two sides apart, placing the shaped slot over the rib, and securing the clamp to the rib using a fastener through the two sides to reduce a likelihood of the two sides separating.

7. The clamp of claim 1, wherein the rib has a T-shaped cross section.

8. The clamp of claim 1, wherein the two sides are formed monolithic with the top.

9. The clamp of claim 1, wherein the shaped slot has a T-shaped cross section.

10. A clamp for securing a component to an isogrid case of a gas turbine engine, the clamp comprising:

a top having an attachment feature for coupling the clamp to the component;

a bottom; and two sides extending from the top towards the bottom, each of the two sides being thicker at the bottom than at the top, and the two sides defining a shaped slot closer to the bottom than the top for receiving a rib of the isogrid case, the rib having a vertical portion extending at a right angle from a surface of the isogrid case and a horizontal portion extending in a direction parallel to the surface, a right angle being formed between a vertical outer surface of the vertical portion and a horizontal outer surface of the horizontal portion, the shaped slot having a vertical portion having a corresponding shape and dimension of the vertical portion of the rib and a horizontal portion having a corresponding shape and dimension as the horizontal portion of the rib, and each of the two sides defining a boss for receiving a fastener, wherein each of the two sides defines a lightening hole closer to the bottom than the top and configured to reduce a total weight of the clamp, wherein the lightening holes are disposed between a central opening and the bottom, wherein the central opening is defined between the two sides.

11. The clamp of claim 10, wherein the boss on at least one of the two sides is threaded.

12. The clamp of claim 10, wherein the attachment feature includes a threaded post formed monolithically with the clamp or coupled to the clamp.

13. The clamp of claim 10, wherein the clamp is configured to be fastened to the rib of the isogrid case by spreading the two sides apart, placing the shaped slot over the rib, and securing the clamp to the rib using the fastener through the two sides to reduce a likelihood of the two sides separating.

14. A system for securing components to a gas turbine engine, the system comprising:

an isogrid case having a rib and configured to be coupled to the gas turbine engine; and a clamp for securing a component to the isogrid case and having:

a top having an attachment feature for coupling the clamp to the component, a bottom, and two sides extending from the top towards the bottom, each of the two sides being thicker at the bottom than at the top, and the two sides defining a shaped slot closer to the bottom than the top for receiving the rib of the isogrid case to couple the clamp to the isogrid case, the rib having a vertical portion extending at a right angle from a surface of the isogrid case and a horizontal portion extending in a direction parallel to the surface, a right angle being formed between a vertical outer surface of the vertical portion and a horizontal outer surface of the horizontal portion, the shaped slot having a vertical portion having a corresponding shape and dimension of the vertical portion of the rib and a horizontal portion having a corresponding shape and dimension as the horizontal portion of the rib, wherein each of the two sides defines a lightening hole closer to the bottom than the top and configured to reduce a total weight of the clamp, wherein the lightening holes are disposed between a central opening and the bottom, wherein the central opening is defined between the two sides.

15. The system of claim 14, wherein the vertical portion of the shaped slot is defined between the two sides, and the horizontal portion of the shaped slot is partially defined by a first side of the two sides and partially defined by a second side of the two sides.

16. The system of claim 14, wherein each of the two sides defines a boss for receiving a fastener, and wherein the boss on at least one of the two sides is threaded.

* * * * *